(12) United States Patent
Kurian et al.

(10) Patent No.: US 12,429,094 B1
(45) Date of Patent: Sep. 30, 2025

(54) HYDROSTATIC PUMP AND COUPLER FOR SAME

(71) Applicant: Robert Bosch GmbH, Stuttgart (DE)

(72) Inventors: Jeemon Kurian, Fountain Inn, SC (US); Jonathan Stewart, Fountain Inn, SC (US); Enrique Busquets, Fountain Inn, SC (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/814,004

(22) Filed: Aug. 23, 2024

(51) Int. Cl.
*F16D 1/10* (2006.01)
*F04C 11/00* (2006.01)
*F04C 15/00* (2006.01)

(52) U.S. Cl.
CPC .............. *F16D 1/10* (2013.01); *F04C 11/001* (2013.01); *F04C 15/0057* (2013.01); *F16D 2001/103* (2013.01); *Y10T 403/7026* (2015.01); *Y10T 403/7035* (2015.01)

(58) Field of Classification Search
CPC .... F16D 1/10; F16D 2001/103; F04C 11/001; F04C 15/0057; Y10T 403/7026; Y10T 403/7035
See application file for complete search history.

(56) References Cited

U.S. PATENT DOCUMENTS

| | | | | |
|---|---|---|---|---|
| 2,380,952 A | * | 8/1945 | Dewey .................. | B60K 17/22 464/182 |
| 2,665,638 A | * | 1/1954 | Lauck ..................... | F04C 14/28 417/319 |
| 6,045,292 A | * | 4/2000 | Placide ................... | F16D 11/14 403/103 |
| 8,545,125 B2 | * | 10/2013 | Brown .................... | F16D 1/101 403/359.1 |
| 8,591,205 B2 | * | 11/2013 | Brown .................... | F04B 17/03 417/423.6 |
| 2010/0272504 A1 | | 10/2010 | Sheth et al. | |
| 2014/0209323 A1 | | 7/2014 | Pisetskiy et al. | |

FOREIGN PATENT DOCUMENTS

| | | |
|---|---|---|
| CN | 208935190 U | 6/2019 |
| GB | 2153927 A | 8/1985 |
| KR | 20100007103 U | 7/2010 |

* cited by examiner

*Primary Examiner* — Mary A Davis
(74) *Attorney, Agent, or Firm* — Michael Best & Friedrich LLP

(57) ABSTRACT

A hydrostatic pump includes a first pumping unit having a first driveshaft extending between a first end and a second end. A second pumping unit has a second driveshaft, the second driveshaft extending between a first end and a second end. A port block is positioned between the first pumping unit and the second pumping unit. A coupler is positioned within the port block, the coupler receiving the second end of the first driveshaft and the first end of the second driveshaft and configured to transmit torque from the first driveshaft to the second driveshaft. The coupler includes an internal spline configured to engage the second end of the first driveshaft and a support land spaced apart from the internal spline via an annular recess, the support land configured to support the first driveshaft at a location between the internal spline and the first end of the first driveshaft.

20 Claims, 6 Drawing Sheets

HYDROSTATIC PUMP AND COUPLER FOR SAME

BACKGROUND

The present disclosure relates to hydrostatic pumps and, in particular, a coupler for coupling together the driveshafts of pumping units of a hydrostatic pump.

SUMMARY

In some aspects, the techniques described herein relate to a hydrostatic pump including: a first pumping unit having a housing and a first driveshaft supported via a first bearing within the housing of the first pumping unit, the first driveshaft extending along a longitudinal axis between a first end and a second end; a second pumping unit having a housing and a second driveshaft supported via a second bearing within the housing of the second pumping unit, the second driveshaft extending along a longitudinal axis between a first end and a second end; a port block positioned between the first pumping unit and the second pumping unit, the port block defining a passage extending therethrough; and a coupler positioned within the passage of the port block, the coupler having an inner surface that receives the second end of the first driveshaft and the first end of the second driveshaft, the coupler configured to transmit torque from the first driveshaft to the second driveshaft, wherein the coupler includes an internal spline configured to engage the second end of the first driveshaft and a support land spaced apart from the internal spline via an annular recess, the support land configured to support the first driveshaft at a location between the internal spline and the first end of the first driveshaft.

In some aspects, the techniques described herein relate to a hydrostatic pump, wherein the internal spline is a first internal spline, the support land is a first support land, and the annular recess is a first annular recess, the coupler further including a second internal spline configured to engage the first end of the second driveshaft and a second support land spaced apart from the second internal spline via a second annular recess, the second support land configured to support the second driveshaft at a location between the second internal spline and the second end of the second driveshaft.

In some aspects, the techniques described herein relate to a hydrostatic pump, wherein the first internal spline is continuous with the second internal spline.

In some aspects, the techniques described herein relate to a hydrostatic pump, wherein the coupler extends from a first longitudinal end to a second longitudinal end, wherein the first longitudinal end extends into the housing of the first pumping unit and wherein the second longitudinal end extends into the housing of the second pumping unit.

In some aspects, the techniques described herein relate to a hydrostatic pump, wherein the longitudinal axis of the first driveshaft is coaxial with the longitudinal axis of the second driveshaft.

In some aspects, the techniques described herein relate to a hydrostatic pump, further including a bushing separate from the coupler and positioned between a wall of the passage and the coupler within the port block.

In some aspects, the techniques described herein relate to a hydrostatic pump, wherein the coupler is a floating member and supported within the bushing by a hydrodynamic fluid.

In some aspects, the techniques described herein relate to a hydrostatic pump, wherein the internal spline has an inner diameter, wherein an inner diameter of the support land is greater than the inner diameter of the internal spline, and wherein an inner diameter of the annular recess is greater than the inner diameter of the support land.

In some aspects, the techniques described herein relate to a hydrostatic pump, wherein the second end of the first driveshaft is spaced apart from the first end of the second driveshaft by an axial gap within the coupler.

In some aspects, the techniques described herein relate to a hydrostatic pump, wherein the coupler includes a first longitudinal end defined such that the support land is located between the first longitudinal end and the internal spline, wherein the support land is spaced apart from the first longitudinal end of the coupler such that the inner surface of the coupler increases in diameter from the support land to the longitudinal end.

In some aspects, the techniques described herein relate to a hydrostatic pump, wherein the support land is an inner lateral cylindrical surface that extends substantially parallel to the longitudinal axis.

In some aspects, the techniques described herein relate to a coupler for a hydrostatic pump configured to transmit torque from a first driveshaft to a second driveshaft, the coupler including: a cylindrical body extending from a first end to a second end, the cylindrical body having an outer surface and an inner surface, wherein the cylindrical body is configured to receive the first driveshaft through the first end and is configured to receive the second driveshaft through the second end; a first internal spline formed on the inner surface and configured to engage the first driveshaft and a second internal spline formed on the inner surface and configured to engage the second driveshaft, the first and second internal splines located between the first and second ends of the cylindrical body; a first support land formed on the inner surface and located between the first internal spline and the first end, the first support land configured to engage the first driveshaft when the first driveshaft is in engagement with the first internal spline; and a second support land formed on the inner surface and located between the second internal spline and the second end; the second support land configured to engage the second driveshaft when the second driveshaft is in engagement with the second internal spline; wherein the first support land is spaced apart from the first internal spline by a first annular recess formed in the inner surface of the cylindrical body; and wherein the second support land is spaced apart from the second internal spline by a second annular recess formed in the inner surface of the cylindrical body.

In some aspects, the techniques described herein relate to a coupler, wherein the first internal spline is continuous with the second internal spline.

In some aspects, the techniques described herein relate to a coupler, wherein a longitudinal axis of the cylindrical body is coaxial with a central axis of the first support land and a central axis of the second support land.

In some aspects, the techniques described herein relate to a coupler, wherein the first internal spline and the second internal spline have an inner diameter, wherein an inner diameter of the first and second support lands is greater than the inner diameter of the first internal spline and the second internal spline, and wherein an inner diameter of the first and second annular recesses is greater than the inner diameter of the first and second support lands.

In some aspects, the techniques described herein relate to a coupler, wherein the first support land is spaced apart from the first end of the coupler by an outer region of the inner surface, wherein a diameter of the outer region increases from the first support land to the first end.

In some aspects, the techniques described herein relate to a coupler, wherein each of the first support land and the second support land is an inner lateral cylindrical surface that extends substantially parallel to a longitudinal axis of the cylindrical body.

In some aspects, the techniques described herein relate to a coupler for a hydrostatic pump configured to transmit torque from a first driveshaft to a second driveshaft, the coupler including: a cylindrical body formed integrally as a single component, the cylindrical body extending from a first end to a second end, the cylindrical body having an outer surface and an inner surface, wherein the cylindrical body is configured to receive the first driveshaft through the first end and is configured to receive the second driveshaft through the second end; wherein the inner surface extends from the first end to the second end, wherein the inner surface includes a first outer region extending from the first end towards the second end, a first support land extending from the first outer region towards the second end, a first annular recess extending from the first support land towards the second end, an internal spline extending from the first annular recess towards the second end, a second annular recess extending from the internal spline towards the second end, a second support land extending from the second annular recess toward the second end, and a second outer region extending from the second support land to the second end, wherein the internal spline and the first support land are configured to engage the first driveshaft and the internal spline and the second support land are configured to engage the second driveshaft.

In some aspects, the techniques described herein relate to a coupler, wherein the outer surface of the cylindrical body has a substantially constant diameter.

In some aspects, the techniques described herein relate to a coupler, wherein each of the first support land and the second support land is an inner lateral cylindrical surface that extends substantially parallel to a longitudinal axis of the cylindrical body.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
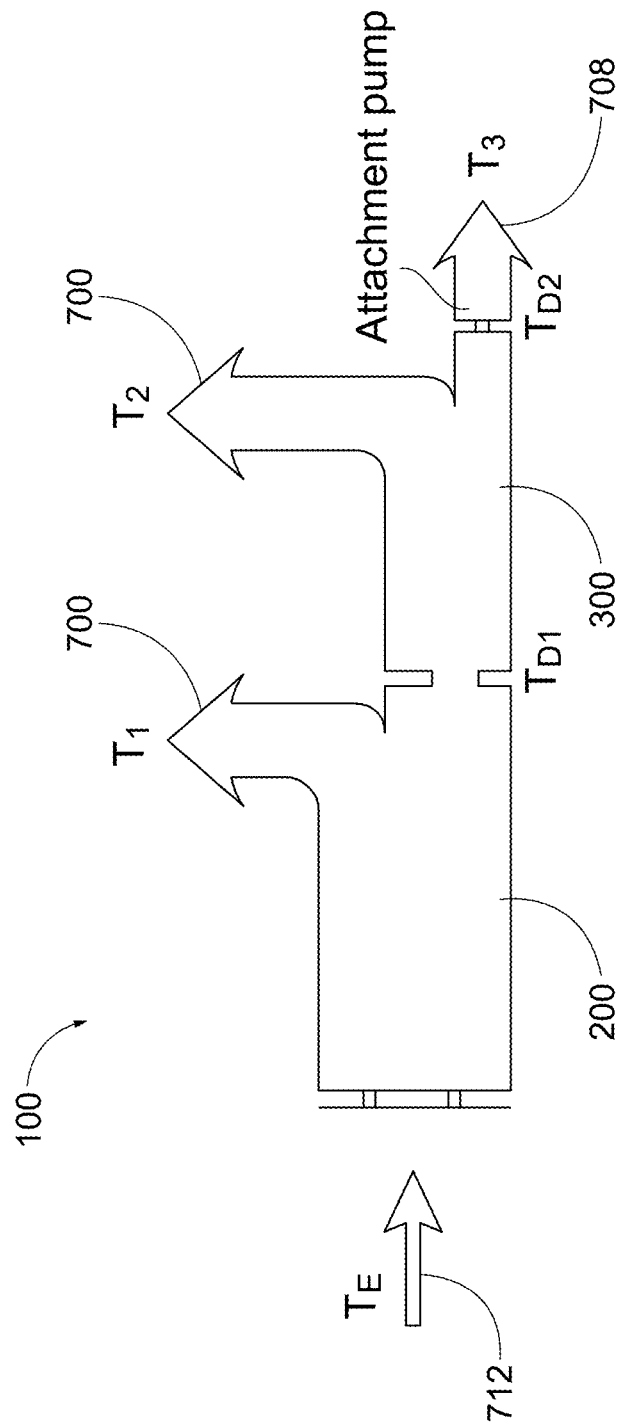
FIG. 1 illustrates torque throughput in a hydrostatic pump.
Figure 2:
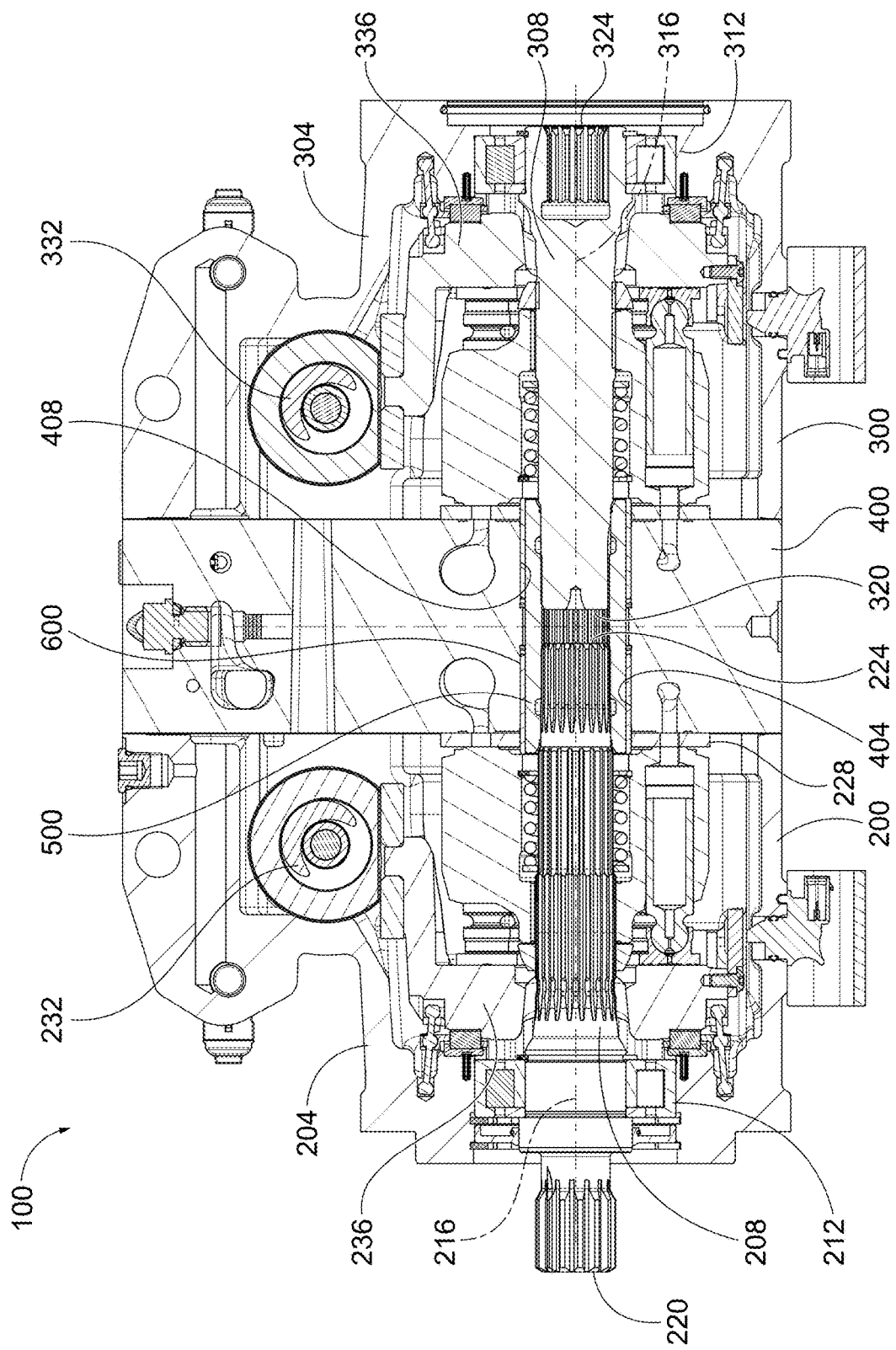
FIG. 2 is a cross-sectional view of a hydrostatic pump.

FIGS. 1-2 illustrate a hydrostatic pump 100 have a front (or first) pumping unit 200 and a rear (or second) pumping unit 300. Each of the pumping units 200, 300 is a rotary group and includes a housing 204, 304. Each rotary group functions to pressurize oil to a desired pressure and deliver an output torque to an outlet port 700, 704, 708. As shown, each rotary group 200, 300 includes a respective outlet and the hydrostatic pump 100 is capable of being modified to attach an attachment pump 708 at its second end as a further output. With reference to FIG. 2, each rotary group 200, 300 is driven by a drive shaft 208 and 308 connected to each other by splines 528, 532. The driveshafts 208, 308 are supported on roller bearing 212, 312 and a bushing 600, contained within the respective pumping unit housing 204, 304 and a port block 400 respectively. The port block 400 is sandwiched between the housings 204, 304 of the pumping units 200, 300. The front driveshaft or first driveshaft 208 receives an input drive 712 (FIG. 1) at a first end 220 of the first driveshaft 208. The first driveshaft 208 transfers the input torque to the rear driveshaft or second driveshaft 308 and to the rotary groups 200, 300. Fluid is pressurized through a distributor plate 228 into the port block 400, which is in turn connected to drive motors (not shown) via hydraulic connections to, for example, help drive a vehicle. Control signals in the form of an electrical current are sent to solenoid valves that pressurize and depressurize different control piston chambers. The control piston chambers are located within the control piston 232 of the first pumping unit 200 and the control piston 332 of the second pumping unit 300. This action results in turning of cradles 236, 336 about a fixed axis, thereby controlling displacement of the rotary group 200, 300.

Figure 3:
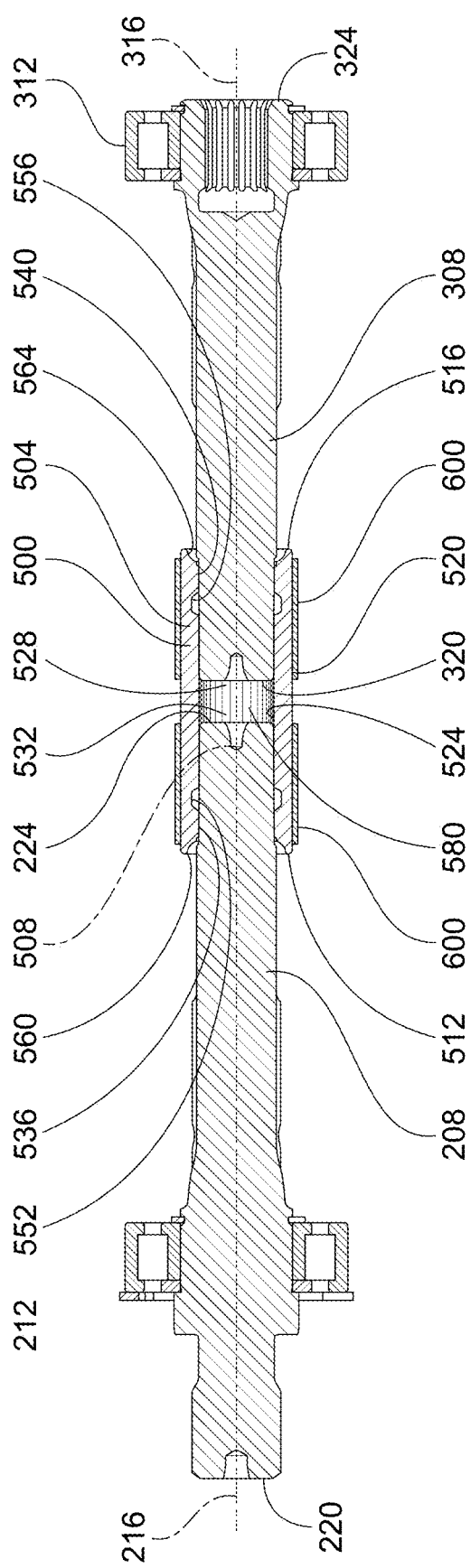
FIG. 3 is a cross-sectional view of first and second driveshafts and a coupler of the hydrostatic pump of FIG. 2.

With reference to FIGS. 2-3, the first driveshaft 208 extends between a first end 220 and a second end 224, the first end 220 defining a first longitudinal extent of the first driveshaft 208 and the second end 224 defining a second longitudinal extent, opposite the first. The first driveshaft 208 rotates about a rotational axis 216 that is also a longitudinal axis of the first driveshaft 208. Similarly, the second driveshaft 308 extends between a first end 320 and a second end 324, the first end 320 defining a first longitudinal extent of the first driveshaft 308 and the second end 324 defining a second longitudinal extent, opposite the first. The second driveshaft 208 rotates about a rotational axis (longitudinal axis) 316. The rotational axis 216 of the first driveshaft 208 is coaxial with the rotational axis 316 of the second driveshaft 308. Written another way, the first and second driveshafts 208, 308 rotate about a shared axis.

The first driveshaft 208 drives the second driveshaft 308 and is coupled to the second driveshaft 308 via a coupler 500 so as to transfer the torque from the first driveshaft 208 to the second driveshaft 308. The coupler 500 is located within a passage 404 of the port block 400, with the bushing 600 seated against an inner wall 408 of the passage 404 and the coupler 500 located within the bushing 600. The bushing 600 is a hollow sleeve (e.g., metal sleeve) having an inner surface against which an outer surface 520 of the coupler 500 is configured to rotate when the first driveshaft 208 is driven. In some embodiments, the bushing 600 is a single bushing and in other embodiments is formed of multiple distinct bushings positioned adjacent one another. In the embodiment shown, two separate bushings 600 are positioned around the two ends of the coupler 500. In some embodiments, the coupler 500 is a floating member and is supported within the bushing (e.g., a single bushing 600, two bushings 600) by a hydrodynamic fluid. In some embodiments, an axial gap 580 is formed between the second end 224 of the first driveshaft 208 and the first end 320 of the second driveshaft 308 such that the two driveshafts 208, 308 are not in direct contact with one another, but are in indirect contact with one another via the coupler 500.

With reference to FIGS. 1-2, the torque $T_E$ at the input 712 (i.e., the torque available from the engine driving the hydrostatic pump 100) results in an output torque $T_1$ at the outlet of the first pumping unit 200 via the first driveshaft 208. The input torque $T_E$ further results in an output torque $T_2$ at the outlet of the second pumping unit 300 via the first driveshaft 208, the second drive driveshaft 308, and the coupler 500 that connects the two driveshafts 208, 308. The input torque $T_E$ also results in an output torque $T_3$ at an attachment pump 708 via the first and second driveshafts 208, 308 and the coupler 500. The through-drive torque from the first driveshaft 208 to the second driveshaft 308 is indicated as $T_{D1}$ and the through-drive torque from the second driveshaft 308 to the attachment pump 708 is indicated as $T_{D2}$. Beyond the torque available at the engine, the greatest limitation on the size of the attachment pump 708 that can be used in a travel-drive application depends on the torque $T_{D2}$ that is transmitted to the rear of the hydrostatic pump 100. By increasing the torque capability at the pump through-drive (i.e., at $T_{D1}$), the available torque $T_{D2}$ available to the attachment pump 708 likewise increases.

In order to increase the torque capability $T_{D1}$, the coupler 500 is modified relative to prior art couplers (e.g., coupler 500' in FIG. 5) to reduce bending of the driveshafts 208, 308. As the driveshafts 208, 308 are supported at their ends, the driveshafts 208, 308 experience U-shaped bending when under vertical load. Due to this behavior, bending from one driveshaft 208 is transmitted to the other driveshaft 308 based on their coupling. Increased bending stresses induce additional stress in the driveline, which reduces through-drive capability. The coupler 500 includes elements as described in greater detail with respect to FIGS. 2-4B that reduce bending stresses and increase through-drive capability.

The coupler 500 includes a cylindrical body 504 that extends between a first longitudinal end 512 and a second longitudinal end 516. The coupler 500 is integrally formed as a single component. The cylindrical body 504 is hollow (i.e., tubular) having a thickness defined between the outer surface 520 (as shown, having a substantially constant diameter) and an inner surface 524. The cylindrical body 504 defines a longitudinal axis 512 that is also a rotational axis of the coupler 500. The longitudinal axis 512 is coaxial with the rotational axes 216, 316 of the first and second driveshafts 208, 308.

The coupler 500 includes a first internal spline 528 formed at the inner surface 524 of the cylindrical body 504 at a location between the first and second longitudinal ends 512, 516. The first internal spline 528 is configured to engage a mating spline at the second end 224 of the first driveshaft 208 such that rotation of the first driveshaft 208 results in similar rotation of the coupler 500 via the spline interface therebetween. A second internal spline 532 is formed at the inner surface 524 and is configured to engage a mating spline at the first end 320 of the second driveshaft 308 such that rotation of the coupler 500 results in similar rotation of the second driveshaft 308 via the spline interface therebetween. In some embodiments, the first and second splines 528, 532 are substantially similar in design (e.g., spacing, size) to one another and in some embodiments, the first and second splines are contiguous with one another such that they are formed as a single spline 528, 532. In alternative embodiments, the splines 528, 532 may be spaced apart from one another. In some embodiments, the splines 528, 532 are formed as a rectangular or hemispherical (or other curvilinear) profile to engage a mating profile on the respective driveshaft 208, 308.

Figure 4A:
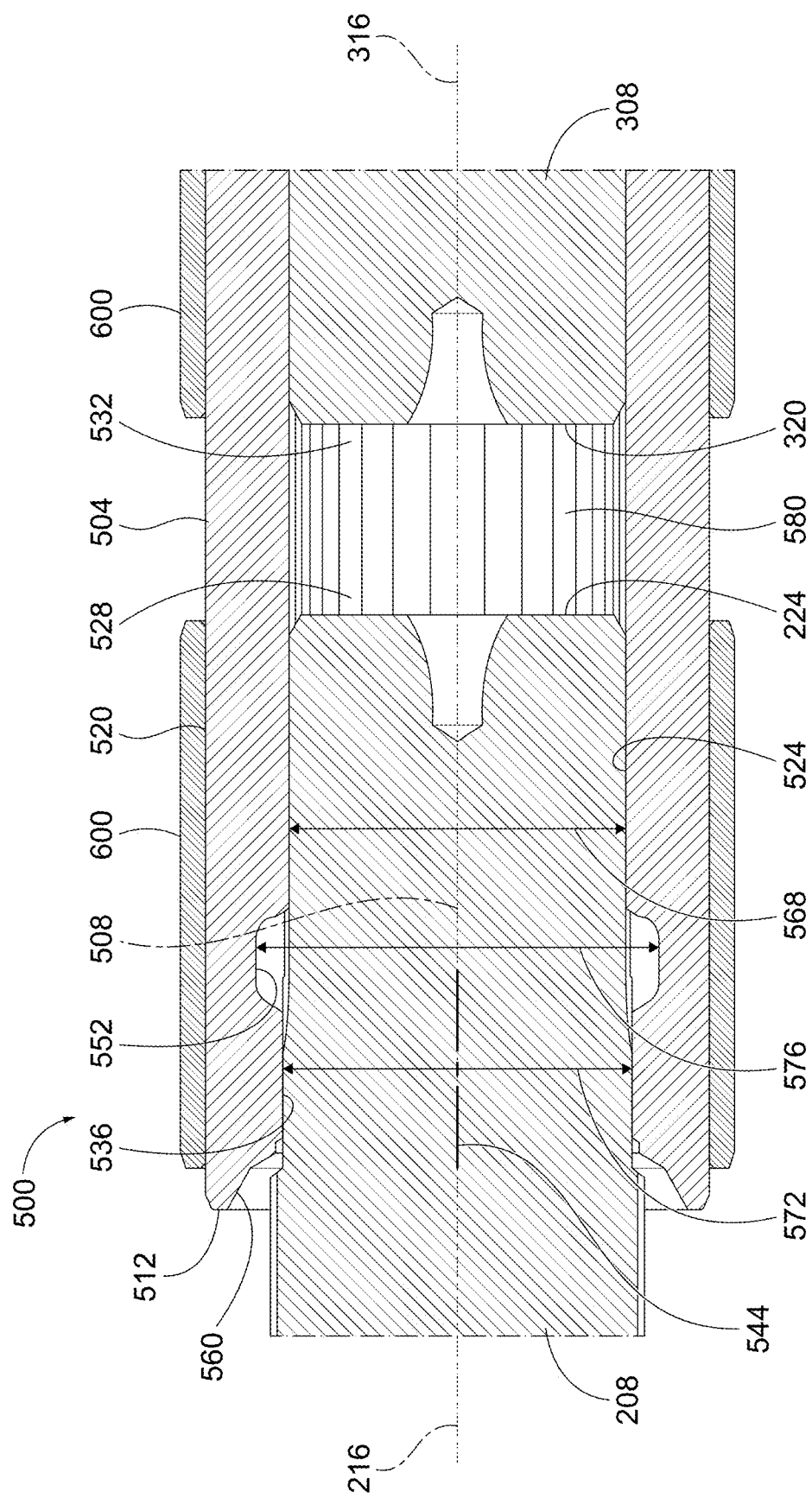
FIG. 4A is an enlarged cross-sectional view of a first end of the coupler.
Figure 4B:
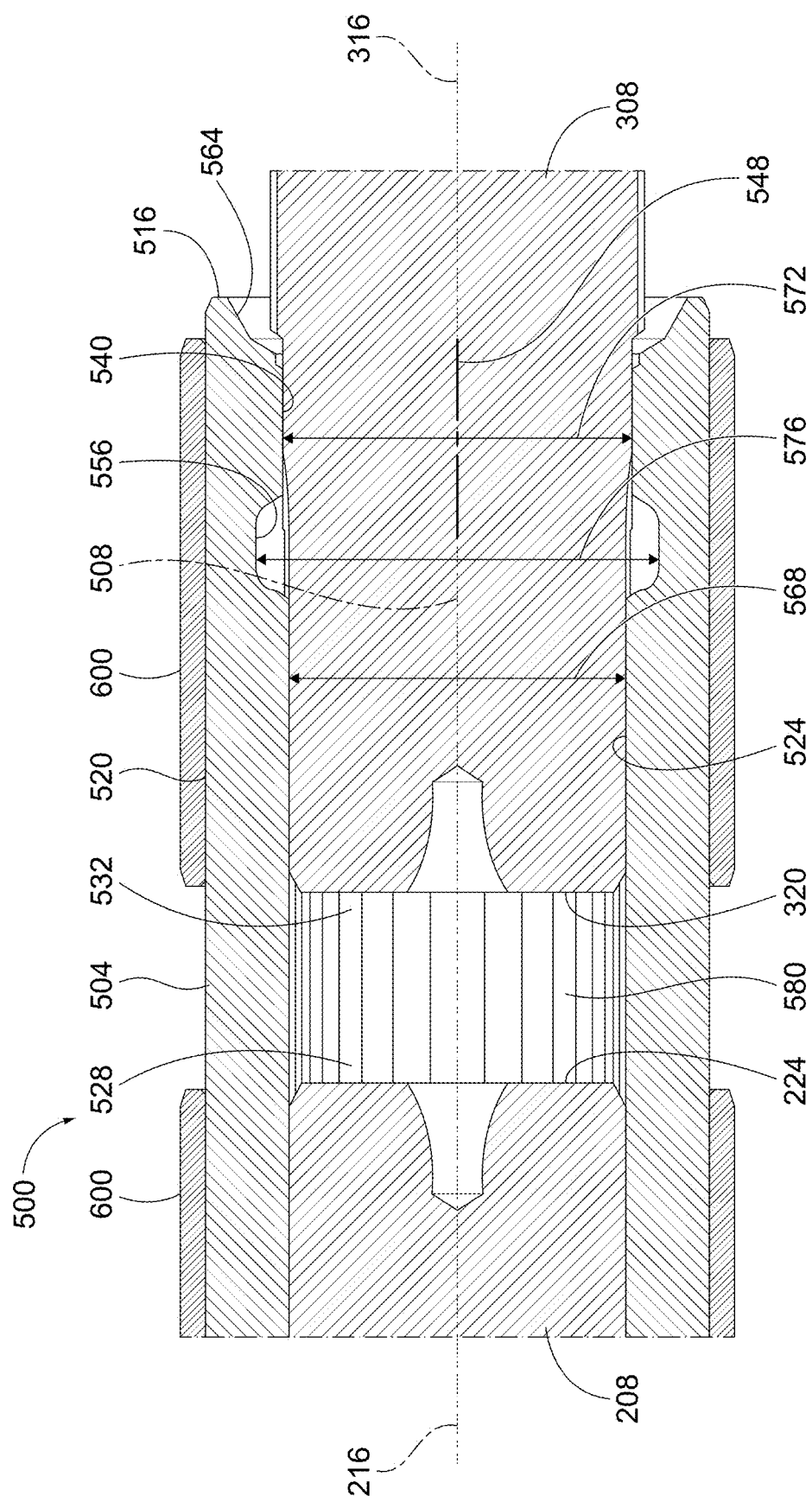
FIG. 4B is an enlarged cross-sectional view of a second end of the coupler.

As shown in greater detail in FIGS. 4A and 4B, a first support land 536 is formed at the inner surface 524 of the cylindrical body 504 at a location between the first longitudinal end 512 of the cylindrical body 504 and the first internal spline 528. Similarly, a second support land 540 is formed at the inner surface 524 of the cylindrical body 504 at a location between the second internal spline 532 and the second longitudinal end 516 of the cylindrical body 504. The support lands 536, 540 are spaced apart from the first and second splines 528, 532 such that a portion of the inner surface 524 of the cylindrical body 504 of the coupler 500 is dissimilar from the splines 528, 532 and support lands 536, 540 and is located longitudinally between the respective splines 528, 532 and adjacent support lands 536, 540. The support lands 536, 540 restrict bending of the driveshafts 208, 308 under load, reducing the bending stress, and increasing the torque throughput to the second driveshaft 308 at the coupler 500. Each support land 536, 540 is an inner lateral cylindrical surface that extends substantially parallel to the longitudinal axis 508 of the coupler 500. In some embodiments, the inner lateral cylindrical surface may not be a purely cylindrical surface, having surface roughness, indentations, or other similar minor deviations so as to be a non-homogeneous cylindrical surface. In some embodiments, the support lands 536, 540 may be machined from a previously splined surface and may retain a portion of the spline.

In the embodiment shown, an annular recess 552, 556 is formed at the inner surface 524 to separate the support lands 536, 540 from the adjacent splines 528, 532. Each support land 536, 540 forms a surface configured to engage the respective driveshaft 208, 308 at a location spaced apart from the spline interface. In the embodiment shown, the support lands 536, 540 have a similar size (e.g., length in the longitudinal direction, diameter) and profile, though in other embodiments, the support lands 536, 540 may differ in size and/or profile from one another (e.g., if the driveshafts 208, 308 are dissimilar from one another). As the support lands 536, 540 are generally cylindrical, each support land 536, 540 defines a central axis 544, 548. The central axes 544, 548 of the support lands 536, 540 are coaxial with one another and are coaxial with the longitudinal axis 508 of the cylindrical body 504.

The annular recesses 552, 556 are formed at the inner wall and extend radially outward relative to the splines 528, 532 and support lands 536, 540 such that a thickness of the cylindrical body 504 (having a uniform cylindrical outer surface 520) at the annular recesses 552, 556 is less than a thickness at the splines 528, 532 and support lands 536, 540. Each annular recess 552, 556 is defines by a radius adjacent the respective spline 528, 532 and a further radius adjacent the respective support land 536, 540 with a substantially longitudinal portion between the two radii. The length (i.e., in the longitudinal direction) of the annular recesses 552, 556 is less than the length of the adjacent one of the support lands 536, 540 and the adjacent one of the splines 528, 532. In some embodiments, a length of the annular recesses 552, 556 is between 25%-100% of the length of the support lands 536, 540. In some embodiments, a length of the annular recesses 552, 556 is between 50%-75% of the length of the support lands 536, 540.

The splines 528, 532 have an inner diameter 568 and the support lands 536, 540 have an inner diameter 572. The inner diameter 572 of the support lands 536, 540 is not smaller than the inner diameter 568 of the splines 528, 532.

In some embodiments, the inner diameter 572 of the support lands 536, 540 is greater than the inner diameter 568 of the splines 528, 532. An inner diameter 576 of the annular recesses 552, 556 is greater than the inner diameters 568, 572 of the splines 528, 532 and the support lands 536, 540 and defines a largest diameter 568 of the inner surface 524 between (and inclusive of) the two support lands 536, 540. In some embodiments, first and second outer regions 560, 564 of the inner surface 524 located adjacent the first and second longitudinal ends 512, 516 of the cylindrical body 504 have a larger diameter than the diameter 568 defined by the annular recesses 552, 556 to facilitate easier insertion of the driveshafts 208, 308 into the respective ends 512, 516 of the coupler 500.

Extending longitudinally from the first end 512 of the coupler 500 to the second end 516 of the coupler 500, the inner surface 524 includes, in order, the first outer region 560 extending from the first end 512 towards the second end 516, a first support land 536 extending from the first outer region 560 towards the second end 516, a first annular recess 552 extending from the first support land 536 towards the second end 516, an internal spline (including continuous or separate first and second internal splines 528, 532) extending from the first annular recess 552 towards the second end 516, a second annular recess 556 extending from the internal spline 528, 532 towards the second end 516, a second support land 540 extending from the second annular recess 556 toward the second end 516, and a second outer region 564 extending from the second support land 540 to the second end 516. Each of the elements of the inner surface 524 of the coupler 500 is integrally formed as a single component with the remainder of the coupler 500.

Figure 6:
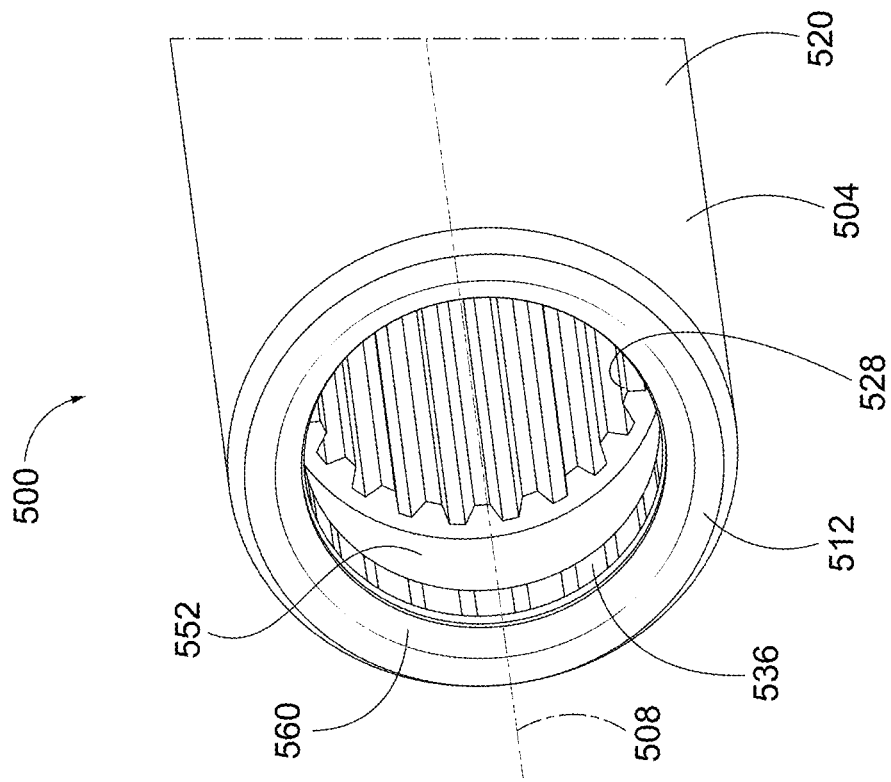
FIG. 6 is a perspective view of a first end of the coupler of FIGS. 2-4B.
Figure 5:
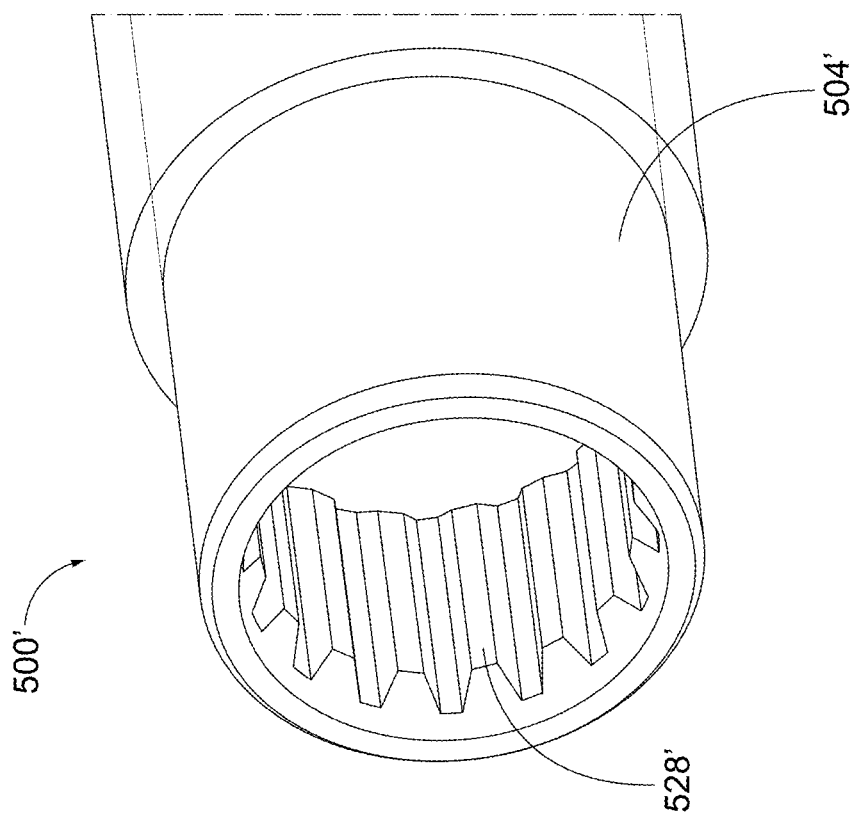
FIG. 5 is a perspective view of a first end of a coupler according to the prior art.

FIG. 5 illustrates a coupler 500' according to the prior art that includes a cylindrical body 504' that defines an internal spline 528' for engaging a driveshaft (similar to driveshaft 208) but omits any support land (and therefore also omits any annular recess between a spline and driveshaft). FIG. 6 illustrates a similar view of the coupler 500 shown and described with respect to FIGS. 2-4B, including the support land 536 and annular recess 552.

The rigid support provided by the coupler 500 in FIG. 6 at the support lands 536, 540 reduces the amount of deflection on the respective driveshaft 208, 308 compared to the coupler 500' in FIG. 5, reducing the stress in the driveline. With the same through-drive torque transmitted through each of the couplers 500, 500', the stress within the coupler 500' (FIG. 5) is 18% greater than the stress within the coupler 500 (FIG. 6). As such, because of the decreased stress, the coupler 500 is capable of a higher through-drive torque than the prior art coupler 500'. With an increased through-drive torque, an auxiliary pump 708 (FIG. 1) having a larger displacement can be mounted to the rear of the hydrostatic pump 100, increasing the capabilities and potential applications of the hydrostatic pump 100.

Various features of the disclosure are set forth in the following claims.

What is claimed is:

1. A hydrostatic pump comprising:
 a first pumping unit having a housing and a first driveshaft supported via a first bearing within the housing of the first pumping unit, the first driveshaft extending along a longitudinal axis between a first end and a second end;
 a second pumping unit having a housing and a second driveshaft supported via a second bearing within the housing of the second pumping unit, the second driveshaft extending along a longitudinal axis between a first end and a second end;
 a port block positioned between the first pumping unit and the second pumping unit, the port block defining a passage extending therethrough; and
 a coupler positioned within the passage of the port block, the coupler having an inner surface that receives the second end of the first driveshaft and the first end of the second driveshaft, the coupler configured to transmit torque from the first driveshaft to the second driveshaft, wherein the coupler includes an internal spline configured to engage the second end of the first driveshaft and a support land spaced apart from the internal spline via an annular recess, the support land configured to support the first driveshaft at a location between the internal spline and the first end of the first driveshaft.

2. The hydrostatic pump of claim 1, wherein the internal spline is a first internal spline, the support land is a first support land, and the annular recess is a first annular recess, the coupler further comprising a second internal spline configured to engage the first end of the second driveshaft and a second support land spaced apart from the second internal spline via a second annular recess, the second support land configured to support the second driveshaft at a location between the second internal spline and the second end of the second driveshaft.

3. The hydrostatic pump of claim 2, wherein the first internal spline is continuous with the second internal spline.

4. The hydrostatic pump of claim 1, wherein the coupler extends from a first longitudinal end to a second longitudinal end, wherein the first longitudinal end extends into the housing of the first pumping unit and wherein the second longitudinal end extends into the housing of the second pumping unit.

5. The hydrostatic pump of claim 1, wherein the longitudinal axis of the first driveshaft is coaxial with the longitudinal axis of the second driveshaft.

6. The hydrostatic pump of claim 1, further comprising a bushing separate from the coupler and positioned between a wall of the passage and the coupler within the port block.

7. The hydrostatic pump of claim 6, wherein the coupler is a floating member and supported within the bushing by a hydrodynamic fluid.

8. The hydrostatic pump of claim 1, wherein the internal spline has an inner diameter, wherein an inner diameter of the support land is greater than the inner diameter of the internal spline, and wherein an inner diameter of the annular recess is greater than the inner diameter of the support land.

9. The hydrostatic pump of claim 1, wherein the second end of the first driveshaft is spaced apart from the first end of the second driveshaft by an axial gap within the coupler.

10. The hydrostatic pump of claim 1, wherein the coupler includes a first longitudinal end defined such that the support land is located between the first longitudinal end and the internal spline, wherein the support land is spaced apart from the first longitudinal end of the coupler such that the inner surface of the coupler increases in diameter from the support land to the longitudinal end.

11. The hydrostatic pump of claim 1, wherein the support land is an inner lateral cylindrical surface that extends substantially parallel to the longitudinal axis.

12. A coupler for a hydrostatic pump configured to transmit torque from a first driveshaft to a second driveshaft, the coupler comprising:
 a cylindrical body extending from a first end to a second end, the cylindrical body having an outer surface and an inner surface, wherein the cylindrical body is configured to receive the first driveshaft through the first end and is configured to receive the second driveshaft through the second end;

a first internal spline formed on the inner surface and configured to engage the first driveshaft and a second internal spline formed on the inner surface and configured to engage the second driveshaft, the first and second internal splines located between the first and second ends of the cylindrical body;

a first support land formed on the inner surface and located between the first internal spline and the first end, the first support land configured to engage the first driveshaft when the first driveshaft is in engagement with the first internal spline; and a second support land formed on the inner surface and located between the second internal spline and the second end; the second support land configured to engage the second driveshaft when the second driveshaft is in engagement with the second internal spline;

wherein the first support land is spaced apart from the first internal spline by a first annular recess formed in the inner surface of the cylindrical body; and wherein the second support land is spaced apart from the second internal spline by a second annular recess formed in the inner surface of the cylindrical body.

13. The coupler of claim 12, wherein the first internal spline is continuous with the second internal spline.

14. The coupler of claim 12, wherein a longitudinal axis of the cylindrical body is coaxial with a central axis of the first support land and a central axis of the second support land.

15. The coupler of claim 12, wherein the first internal spline and the second internal spline have an inner diameter, wherein an inner diameter of the first and second support lands is greater than the inner diameter of the first internal spline and the second internal spline, and wherein an inner diameter of the first and second annular recesses is greater than the inner diameter of the first and second support lands.

16. The coupler of claim 12, wherein the first support land is spaced apart from the first end of the coupler by an outer region of the inner surface, wherein a diameter of the outer region increases from the first support land to the first end.

17. The coupler of claim 12, wherein each of the first support land and the second support land is an inner lateral cylindrical surface that extends substantially parallel to a longitudinal axis of the cylindrical body.

18. A coupler for a hydrostatic pump configured to transmit torque from a first driveshaft to a second driveshaft, the coupler comprising:

a cylindrical body formed integrally as a single component, the cylindrical body extending from a first end to a second end, the cylindrical body having an outer surface and an inner surface, wherein the cylindrical body is configured to receive the first driveshaft through the first end and is configured to receive the second driveshaft through the second end;

wherein the inner surface extends from the first end to the second end, wherein the inner surface includes a first outer region extending from the first end towards the second end, a first support land extending from the first outer region towards the second end, a first annular recess extending from the first support land towards the second end, an internal spline extending from the first annular recess towards the second end, a second annular recess extending from the internal spline towards the second end, a second support land extending from the second annular recess toward the second end, and a second outer region extending from the second support land to the second end, wherein the internal spline and the first support land are configured to engage the first driveshaft and the internal spline and the second support land are configured to engage the second driveshaft.

19. The coupler of claim 18, wherein the outer surface of the cylindrical body has a substantially constant diameter.

20. The coupler of claim 18, wherein each of the first support land and the second support land is an inner lateral cylindrical surface that extends substantially parallel to a longitudinal axis of the cylindrical body.

* * * * *